(12) United States Patent  
Wang

(10) Patent No.: US 11,199,391 B2  
(45) Date of Patent: Dec. 14, 2021

(54) DIGITAL MEASURING TAPE

(71) Applicant: Shenzhen Dobiy Electronic Co., Ltd, Shenzhen (CN)

(72) Inventor: Zhenxing Wang, Shenzhen (CN)

(73) Assignee: Shenzhen Dobiy Electronic Co., Ltd, Shenzhen (CN)

( * ) Notice: Subject to any disclaimer, the term of this patent is extended or adjusted under 35 U.S.C. 154(b) by 117 days.

(21) Appl. No.: 16/480,317

(22) PCT Filed: Aug. 15, 2017

(86) PCT No.: PCT/CN2017/097470  
§ 371 (c)(1),  
(2) Date: Jul. 24, 2019

(87) PCT Pub. No.: WO2019/024133  
PCT Pub. Date: Feb. 7, 2019

(65) Prior Publication Data  
US 2019/0376776 A1    Dec. 12, 2019

(30) Foreign Application Priority Data  
Aug. 2, 2017    (CN) .......................... 201710653123.9

(51) Int. Cl.  
*G01B 3/1061*    (2020.01)  
*G01B 3/1041*    (2020.01)  
*G01B 3/1069*    (2020.01)

(52) U.S. Cl.  
CPC ......... *G01B 3/1061* (2013.01); *G01B 3/1041* (2013.01); *G01B 3/1069* (2020.01)

(58) Field of Classification Search  
CPC .. G01B 3/1061; G01B 3/1041; G01B 3/1069; G01B 3/10  
USPC .......................................................... 33/762  
See application file for complete search history.

(56) References Cited

U.S. PATENT DOCUMENTS

| | | | | |
|---|---|---|---|---|
| 4,181,960 A | * | 1/1980 | Tateishi | G01B 3/1084 702/164 |
| 4,242,574 A | * | 12/1980 | Grant | G01D 5/24404 377/18 |
| 4,575,944 A | * | 3/1986 | Lin | G01B 3/1061 33/762 |

(Continued)

FOREIGN PATENT DOCUMENTS

| CN | 2672613 Y | 1/2005 |
|---|---|---|
| CN | 2823973 Y | 10/2006 |

(Continued)

*Primary Examiner* — Yaritza Guadalupe-McCall

(57) ABSTRACT

A digital measuring tape includes a shell body, a tape, and a tape spool. A coiling shaft is provided inside the shell body. The tape spool is installed on the coiling shaft for rotating with respect to the coiling shaft. The tape is coiled around the tape spool, and a front end of the tape is provided with a hook. The digital measuring tape further includes a grid dial, a grid detector, a circuit board, and a display screen. The grid dial is fixed on the tape spool for rotating. A circumferential edge of the grid dial is provided with a plurality of grids. Rotation of the grid dial and the grids enables the grid detector to produce a detecting signal of rotation of the grid dial. With the detecting signal, a length of the pulled tape is calculated through the circuit board, and displayed on the display screen.

8 Claims, 3 Drawing Sheets

(56) References Cited

U.S. PATENT DOCUMENTS

| | | | | |
|---|---|---|---|---|
| 4,658,134 | A | * | 4/1987 | Okumura ............. G01B 3/1061 250/237 G |
| 5,027,526 | A | * | 7/1991 | Crane ................... G01B 3/1061 33/763 |
| 5,142,793 | A | * | 9/1992 | Crane ................... G01B 3/1061 33/763 |
| 2004/0040170 | A1 | * | 3/2004 | Sanoner ................... G01B 3/11 33/762 |
| 2006/0025706 | A1 | * | 2/2006 | Chen ......................... A41H 1/02 600/587 |
| 2014/0101948 | A1 | * | 4/2014 | Lee ........................... G01B 3/10 33/2 R |
| 2019/0376776 | A1 | * | 12/2019 | Wang ................... G01B 3/1041 |

FOREIGN PATENT DOCUMENTS

| | | |
|---|---|---|
| CN | 204881503 U | 12/2015 |
| CN | 204963696 U | 1/2016 |

\* cited by examiner

DIGITAL MEASURING TAPE

CROSS REFERENCE TO THE RELATED APPLICATIONS

This application is the national phase entry of International Application No. PCT/CN2017/097470, filed on Aug. 15, 2017, which is based upon and claims priority to Chinese Patent Application No. 201710653123.9, filed on Aug. 2, 2017, the entire contents of which are incorporated herein by reference.

TECHNICAL FIELD

The present invention belongs to the technical field of measuring instruments, particularly to a measuring tape, and specifically to a digital measuring tape.

BACKGROUND

Measuring tape is a measuring tool frequently used in daily life. According to different materials, the measuring tape can be classified into fiberglass measuring tape, cloth measuring tape, and steel measuring tape. The steel measuring tape or the cloth measuring tape is dominant among the most common measuring tapes. The steel measuring tape is the most popular, which is commonly used in construction and decoration, as well as one of the household necessities.

During measurement, users have to directly read a scale reading on the measuring tape. As for general occasions, since an accurate value is not required, and there is no requirement for the time of measurement, the existing measuring tapes can basically satisfy requirements. However, in case of requiring high measurement accuracy, an ordinary measuring tape is not convenient and accurate enough, and hard to record and read.

SUMMARY

It is an objective to provide a digital measuring tape, capable of directly displaying a measured reading, which is convenient for using, recording and reading.

To this end, the technical solution of the present invention is as follows.

The present invention provides a digital measuring tape, including a shell body, a tape, and a tape spool, wherein a coiling shaft is provided inside the shell body, the tape spool is installed on the coiling shaft for rotating with respect to the coiling shaft, the tape is coiled around the tape spool, and a front end of the tape is provided with a hook.

The digital measuring tape further includes a grid dial, a grid detector, a circuit board, and a display screen, wherein the grid dial is fixed on the tape spool for rotating, and a circumferential edge of the grid dial is provided with a plurality of grids to form a circle. Rotation of the grid dial and the grids enables the grid detector to produce a detecting signal of rotation of the grid dial. With the detecting signal, a length of the pulled tape is calculated through the circuit board, and displayed on the display screen.

When a user holds the hook to pull out the tape, the tape spool and the grid dial rotate, an alternating detecting signal is detected by the grid detector, and a signal varying between a high level and a low level is output. Since the interval between the grids on the grid dial is known, a length by which the tape is pulled out can be obtained when each grid changes. The alternating signal from the grid detector is processed through a chip on the circuit board to calculate the length. The length is output to display on the display screen.

The tape is pulled out by n turn from a zero position, namely, the grid dial rotates to the $n^{th}$ turn. At this time, a corresponding grid number on the grid dial detected by the grid detector is M, the grid number corresponding to each circle of the grid dial is S. Assuming a length of the first circle of the tape is L1, a length of the second circle of the tape is L2, and so on, the length of the pulled tape is:

$$L=L1+L2 \ldots +L_{(n-1)}+(L_n/S*M)$$

Thereinto, the length of the each circle of tape that is pulled out is measured and stored in advance, which is a known value. Only the number of turns where the grid dial is located and the corresponding grid number are required to be detected by the grid detector, and then the result can be obtained by directly calculating using the above formula.

In one embodiment of the above technical solution, the grids are a plurality of through holes evenly arranged on a circumference. The grid detector is an optical grating sensor, a light source and an optoelectronic element of the optical grating sensor are respectively provided on two sides of the through holes. A light emitted by the light source may be received via the through holes by the optoelectronic element.

In one embodiment of the above technical solution, the grid detector is a capacitive grating sensor. The grids are a plurality of movable grating rulers of the capacitive grating sensor evenly arranged on a circumference. A fixed grating ruler of the capacitive grating sensor is fixed on the shell body. The capacitive grating sensor is connected to the circuit board.

In one embodiment of the above technical solution, the grid detector is a Hall effect sensor. The grids are a plurality of magnetic components evenly arranged on a circumference. The Hall effect sensor senses a magnetism change produced by the magnetic components during the rotation of the grid dial, and forms a detecting signal to output to the circuit board.

In one embodiment of the above technical solution, the grid dial is provided with a zero position detecting port. A sensor matching with the zero position detecting port is provided in the shell body. The sensor can be the capacitive grating sensor, the optical grating sensor, or the Hall effect sensor.

In one embodiment of the above technical solution, a number of the grid dial is two, the two grid dials are arranged parallel to each other and fixed with the tape spool.

In one embodiment of the above technical solution, the digital measuring tape further includes a battery and a push button, wherein the battery is mounted in the shell body to supply power for the display screen, the circuit board, and the grid detector, and the push button is connected to the circuit board, inputting operation instructions to the digital measuring tape.

In one embodiment of the above technical solution, the digital measuring tape further includes a tape locking mechanism, wherein the tape locking mechanism includes a locking key, a spring leaf, and a brake block, the locking key is movably installed on the shell body, the spring leaf supports the locking key, the brake block is driven by the locking key to compress or release the tape spool and the tape.

In one embodiment of the above technical solution, a bearing is provided between the tape spool and the coiling shaft. The tape spool is provided with a rewinding mechanism. The rewinding mechanism is a coil spring.

DETAILED DESCRIPTION OF THE EMBODIMENTS

The technical solutions of the present invention are described hereinafter with reference to the drawings and the specific embodiments of the present invention for those skilled in the art to clearly and completely understand the present invention.

Figure 1:
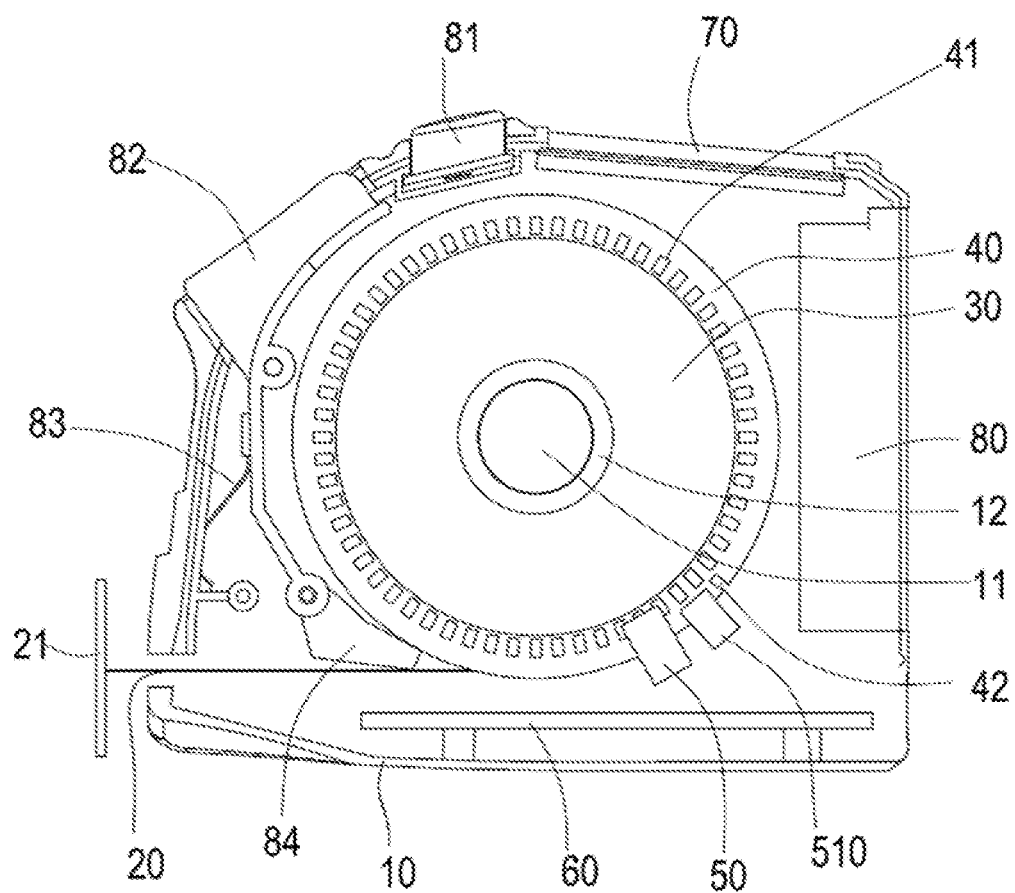
FIG. 1 is a structural diagram showing a digital measuring tape in a first embodiment of the present invention.
Figure 2:
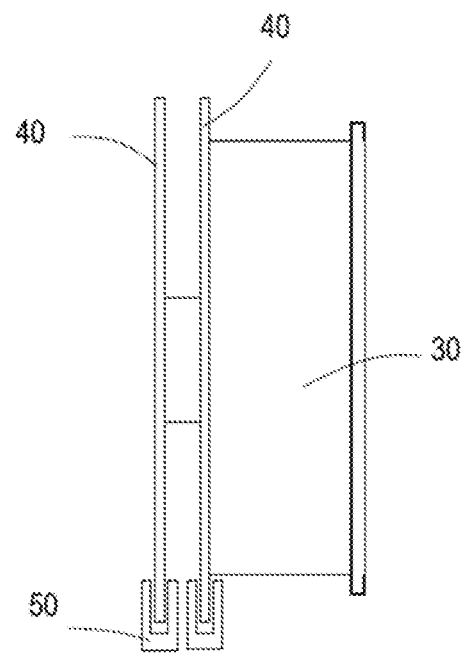
FIG. 2 is a side view showing a tape spool of the digital measuring tape in the first embodiment of the present invention.
Figure 3:
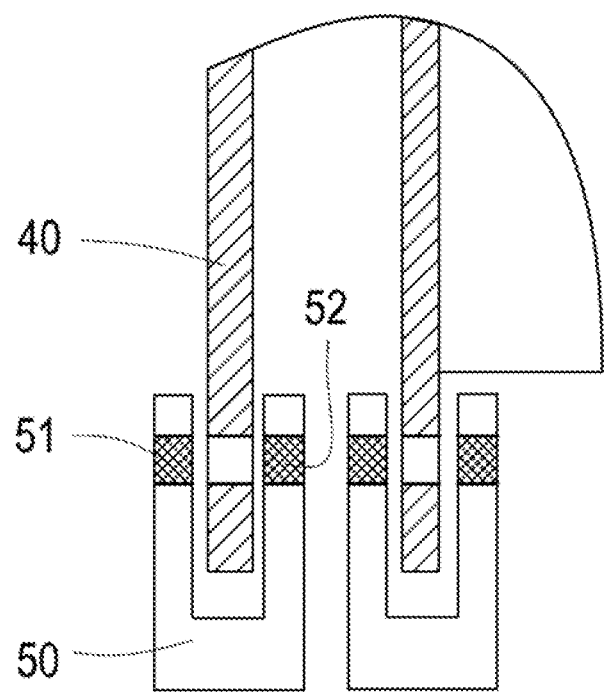
FIG. 3 is a partial view showing a grid dial and a detector of the digital measuring tape in the first embodiment of the present invention.

As shown in FIG. 1, FIG. 2 and FIG. 3, a first embodiment of the present invention is a digital measuring tape, including the shell body 10, the tape 20, the tape spool 30, the grid dial 40, the optical grating sensor 50, the circuit board 60, and the display screen 70. The coiling shaft 11 is provided inside the shell body. The tape spool is installed on the coiling shaft for rotating with respect to the coiling shaft. The tape is coiled around the tape spool. A front end of the tape is provided with the hook 21. The grid dial is fixed on the tape spool for rotating, and a circumferential edge of the grid dial is provided with a plurality of grids 41 to form a circle.

The grids are a plurality of through holes evenly arranged on a circumference. The optical grating sensor includes the light source 51 and the optoelectronic element 52 for receiving, the light source and the optoelectronic element are respectively provided on two sides of the through holes. Light emitted by the light source may be received via the through holes by the optoelectronic element, for generating a high level signal. When the grid dial rotates to depart from the through holes, the light emitted by the light source is blocked by the grid dial. At that time, the optoelectronic element cannot receive the light, thus a low level signal is generated. With the rotation of the grid dial, an alternating signal is produced. Namely, the signal varies between the high level signal and low level signal in an alternating sequence. When each one high level signal is generated, one grid is passed by. A length of the pulled tape is calculated through the circuit board and displayed on the display screen.

To determine a rotation direction of the tape spool, the tape spool is provided with two grid dials and correspondingly provided with the optical grating sensors. The two grid dials are arranged parallel to each other and fixed with the tape spool. Since the two grid dials are arranged in a positive and negative staggered mode, by judging the signals of the two sensors through a processor, whether the tape is pulled out or retracted can be determined.

The grid dial is provided with the zero position detecting port 42. The optical grating sensor 510 matching with the zero position detecting port is provided in the shell body. The zero position detecting port acts as a zero initial position of the grid dial.

The digital measuring tape includes the battery 80, the push button 81 and a tape locking mechanism. The battery is installed in the shell body to supply power for the display screen, the circuit board, and the grid detector. The push button is connected to the circuit board, inputting operation instructions to the digital measuring tape.

The tape locking mechanism includes the locking key 82, the spring leaf 83, and the brake block 84. The locking key is movably installed on the shell body. The spring leaf supports the locking key. The brake block is driven by the locking key to compress or release the tape spool and the tape. When the locking key of the tape locking mechanism is pressed down, the brake block bounces off, and the tape retracts automatically. When the tape is pulled out, the brake block is drawn out simultaneously. At the same time, the spring leaf is compressed to ensure the tape does not get stuck.

The bearing 12 is provided between the tape spool and the coiling shaft. The tape spool is provided with a rewinding mechanism. The rewinding mechanism is a coil spring. The coil spring is not shown in the drawings.

Figure 4:
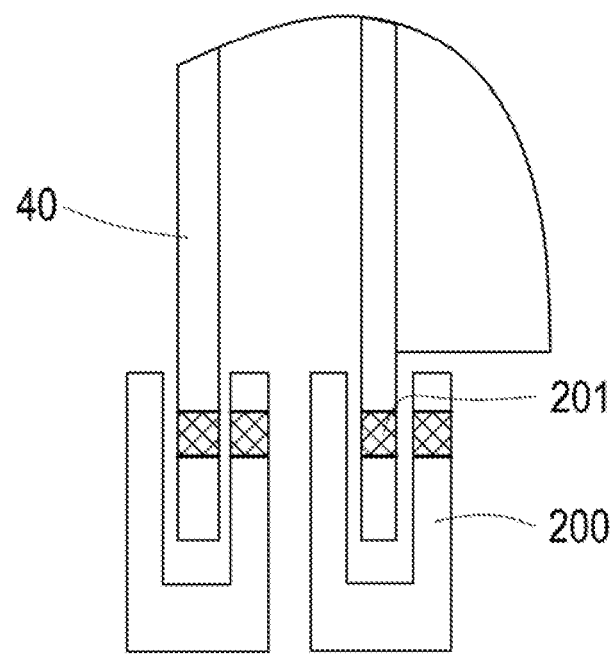
FIG. 4 is a partial view showing a grid dial and a detector of a digital measuring tape in a second embodiment of the present invention.

As shown in FIG. 4, in a second embodiment of the present invention, the Hall effect sensor 200 is employed to replace the optical grating sensor in the first embodiment. Correspondingly, the grids on the grid dial are a plurality of magnetic components 201 evenly arranged on a circumference. The magnetic components are magnets. The Hall effect sensor senses a magnetism change produced by the magnetic components during the rotation of the grid dial, and forms a varying signal between high level and low level to output to the circuit board. The length of the pulled tape is calculated through the circuit board and displayed on the display screen.

Figure 5:
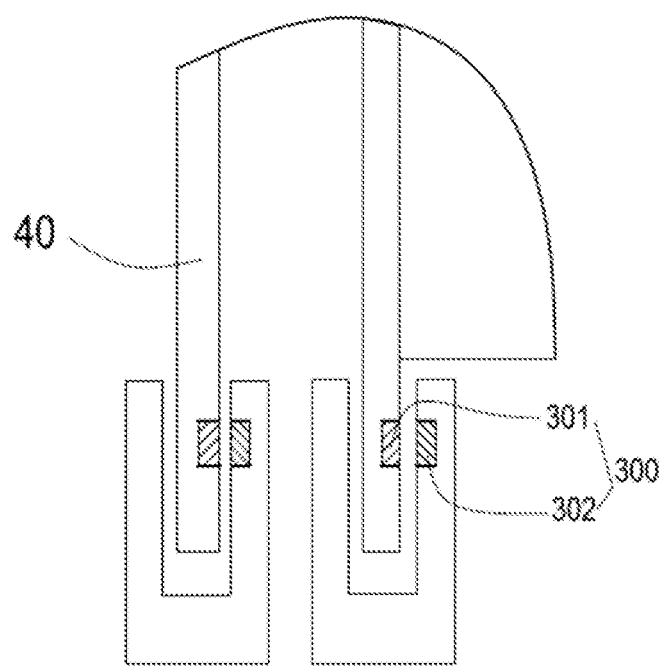
FIG. 5 is a partial view showing a grid dial and a detector of a digital measuring tape in a third embodiment of the present invention.

As shown in FIG. 5, in a third embodiment of the present invention, the capacitive grating sensor 300 is used to replace the optical grating sensor in the first embodiment. Correspondingly, the grids on the grid dial are a plurality of movable grating rulers 301 of the capacitive grating sensor evenly arranged on a circumference. The fixed grating ruler 302 of the capacitive grating sensor is fixed on the shell body. The capacitive grating sensor is connected to the circuit board. When the grid dial rotates, the capacitive grating sensor senses a displacement change, and counts the grids. The length of the pulled tape is calculated through the circuit board and displayed on the display screen.

The above-mentioned embodiments are merely the preferred embodiments of the present invention, and the present invention is not limited by the above embodiments. As for those skilled in the art, any obvious variations made without departing from the technical principle of the present invention should be considered as belonging to the inventive concept of the present invention and falling within the protective scope of the appended claims.

What is claimed is:

1. A digital measuring tape, comprising:
a shell body, a tape, and a tape spool, wherein a coiling shaft is provided inside the shell body, the tape spool is installed on the coiling shaft for rotating with respect to the coiling shaft, the tape is coiled around the tape spool, and a front end of the tape is provided with a hook; and a grid dial, a grid detector, a circuit board, and a display screen, wherein the grid dial is fixed on the tape spool for rotating, a circumferential edge of the grid dial is provided with a plurality of grids to form a circle, a rotation of the grid dial and the plurality of grids enable the grid detector to produce a detecting signal of the rotation of the grid dial, with the detecting signal, a length of a pulled tape is calculated through the circuit board, and shown on the display screen; wherein a number of the grid dial is two, the two grid dials are arranged parallel to each other, and fixed with the tape spool, and the two gird dials correspondingly provided with two optical grating sensors, wherein the two grid dials are arranged in a positive and a negative staggered mode, respectively, and wherein signals of the two optical grating sensors are used to determine whether the tape is pulled out or retracted.

2. The digital measuring tape according to claim 1, wherein the plurality of grids are a plurality of through holes evenly arranged on a circumference of the grid dial, the grid detector is an optical grating sensor, a light source and an optoelectronic element of the optical grating sensor are respectively provided on two sides of the plurality of through holes, light emitted by the light source is received via the plurality of through holes by the optoelectronic element.

3. The digital measuring tape according to claim 1, wherein the grid detector is a capacitive grating sensor, the plurality of grids are a plurality of movable grating rulers of the capacitive grating sensor evenly arranged on a circumference of the grid dial, a fixed grating ruler of the capacitive grating sensor is fixed on the shell body, the capacitive grating sensor is connected to the circuit board.

4. The digital measuring tape according to claim 1, wherein the grid detector is a Hall effect sensor, the plurality of grids are a plurality of magnetic components evenly arranged on a circumference of the grid dial, the Hall effect sensor senses a magnetism change produced by the magnetic components during the rotation of the grid dial, and forms the detecting signal to output to the circuit board.

5. The digital measuring tape according to claim 1, wherein the grid dial is further provided with a zero position detecting port, a sensor matching with the zero position detecting port is provided in the shell body, the sensor is a capacitive grating sensor, an optical grating sensor, or a Hall effect sensor.

6. The digital measuring tape according to claim 1, further comprising a battery and a push button, wherein the battery is provided in the shell body to supply power for the display screen, the circuit board, and the grid detector, the push button is connected to the circuit board, inputting operation instructions to the digital measuring tape.

7. The digital measuring tape according to claim 1, further comprising a tape locking mechanism, wherein the tape locking mechanism comprises a locking key, a spring leaf, and a brake block, the locking key is movably installed on the shell body, the spring leaf supports the locking key, the brake block is driven by the locking key to compress or release the tape spool and the tape.

8. The digital measuring tape according to claim 1, wherein a bearing is provided between the tape spool and the coiling shaft, the tape spool is provided with a rewinding mechanism, and the rewinding mechanism is a coil spring.

\* \* \* \* \*